(12) United States Patent
Tsutsumi et al.

(10) Patent No.: US 9,500,932 B2
(45) Date of Patent: Nov. 22, 2016

(54) FAST-RESPONSE PHOTOREFRACTIVE POLYMER ELEMENT

(71) Applicant: NATIONAL UNIVERSITY CORPORATION KYOTO INSTITUTE OF TECHNOLOGY, Kyoto-shi, Kyoto (JP)

(72) Inventors: Naoto Tsutsumi, Kyoto (JP); Kenji Kinashi, Kyoto (JP); Hironori Shinkai, Kyoto (JP)

(73) Assignee: National University Corporation Kyoto Institute of Technology, Kyoto-shi, Kyoto (JP)

( * ) Notice: Subject to any disclaimer, the term of this patent is extended or adjusted under 35 U.S.C. 154(b) by 0 days.

(21) Appl. No.: 14/425,621

(22) PCT Filed: Aug. 6, 2013

(86) PCT No.: PCT/JP2013/071190
§ 371 (c)(1),
(2) Date: Mar. 3, 2015

(87) PCT Pub. No.: WO2014/038332
PCT Pub. Date: Mar. 13, 2014

(65) Prior Publication Data
US 2015/0227019 A1    Aug. 13, 2015

(30) Foreign Application Priority Data
Sep. 4, 2012    (JP) ................................. 2012-193773

(51) Int. Cl.
*G02F 1/03* (2006.01)
*G02F 1/07* (2006.01)
(Continued)

(52) U.S. Cl.
CPC ........... *G02F 1/397* (2013.01); *G02B 27/4205* (2013.01); *G02B 27/4233* (2013.01);
(Continued)

(58) Field of Classification Search
CPC .......... G02B 27/4205; G02B 27/4233; G02F 1/3501; G02F 1/397
USPC .......... 359/1, 3, 4, 7, 10, 11, 22, 29, 30, 35, 359/315
See application file for complete search history.

(56) References Cited

U.S. PATENT DOCUMENTS

2011/0101361 A1    5/2011    Von Werne et al.

FOREIGN PATENT DOCUMENTS

| JP | 2003-322886 | 11/2003 |
|---|---|---|
| JP | 2011519072 A | 6/2011 |
| JP | 2011158721 | 8/2011 |

OTHER PUBLICATIONS

Takafumi Sassa et al., "Effects of transient dark currents on the buildup dynamics of refractive index changes in photoreactive polymers excited by pulsed voltage", Optical Materials Express, vol. 3, No. 4, Mar. 18, 2013, p. 472-479.
International Search Report of PCTJP2013071190, dated Sep. 3, 2013.

(Continued)

*Primary Examiner* — Mahidere Sahle
(74) *Attorney, Agent, or Firm* — Kristina Castellano; Castellano PLLC

(57) ABSTRACT

The present invention provides a fast-response photorefractive polymer element (1) including two insulating substrates (2, 2) arranged substantially in parallel with each other, ITO electrodes (3, 3) provided on inner surfaces (2a, 2a) of two insulating substrates (2, 2), dark current control layers (4, 4) provided on inner surfaces (3a, 3a) of ITO electrodes (3, 3), and a photorefractive composite material (5) provided between two insulating substrates (2, 2) with ITO electrodes (3, 3) and dark current control layers (4, 4). The photorefractive composite material (5) contains polytriarylamine (PTAA) which is a photorefractive polymer, and a dark current control layer (4) is a single-layered monomolecular film or multi-layered monomolecular films. With these configurations, a fast-response photorefractive polymer element achieves significantly improved responsiveness.

7 Claims, 10 Drawing Sheets

(51) Int. Cl.
| | |
|---|---|
| *G02F 1/39* | (2006.01) |
| *G11B 7/24044* | (2013.01) |
| *G11B 7/245* | (2006.01) |
| *G11B 7/246* | (2013.01) |
| *G02F 1/361* | (2006.01) |
| *G02B 27/42* | (2006.01) |
| *G02F 1/35* | (2006.01) |
| *G03H 1/02* | (2006.01) |

(52) U.S. Cl.
CPC .......... *G02F1/3501* (2013.01); *G02F 1/3611* (2013.01); *G11B 7/245* (2013.01); *G11B 7/246* (2013.01); *G11B 7/24044* (2013.01); *G02F 2001/3505* (2013.01); *G03H 2001/0264* (2013.01); *G03H 2260/54* (2013.01)

(56) References Cited

OTHER PUBLICATIONS

International preliminary report on patentability of PCTJP2013071190, dated Mar. 5, 2015.

S. Tsujimura, et al., "High-Speed Photorefractive Response Capability in Triphenylamine Polymer-Based Composites", Applied Physics Express, Jun. 4, 2012, vol. 5, p. 064101-1-064101-3.

X-D. Sun, et al., "Enhanced current in nematic liquid crystal cell using alkanethiol self-assembled monolayer", Journal of Physics D Applied Physics, Aug. 30, 2007, vol. 40, p. 5691-5695.

T. Fujihara et al., "Acceleration of photorefractive polymers by suppressing a dark current", Extended Abstracts of the 73rd Autumn Meeting, 2012; The Japan Society of Applied Physics Aug. 27, 2012, p. 12-102.

FAST-RESPONSE PHOTOREFRACTIVE POLYMER ELEMENT

CROSS REFERENCE TO RELATED APPLICATIONS

This application is a U.S. National Stage Application of PCT/JP2013/071190 filed on Aug. 6, 2013, which claims priority to Japanese patent application 2012-193773, filed on Sep. 4, 2012, both of which are incorporated herein by reference in their entireties.

TECHNICAL FIELD

The present invention relates to a photorefractive polymer element, and specifically relates to a fast-response photorefractive polymer element in which a triphenylamine polymer is used as a host polymer.

BACKGROUND ART

A certain kind of material is known to have good charge transport property and its application encompasses the following photorefractive effect. The photorefractive effect is one of the nonlinear optical effects and is a phenomenon in which a refractive-index of a substance is changed when light is absorbed by the substance. The following description explains a mechanism of the photorefractive effect. When two laser beams are interfered with each other in a medium having photoconductivity and second-order optical nonlinearity, the interference fringes are formed. In a bright region of the interference fringes, charge carriers are generated by a photo-excitation. Positive charge carriers are moved in the medium with an assistance of an externally applied electric field, and trapped in a dark region. As a result, the periodic distribution of charge density occurs in which the bright region is negatively charged and the dark region is positively charged, and thus a space field between them is formed. The space field induces the Pockels effect through a first-order electro-optical effect, and a periodic refractive-index grating is formed. A phase difference of $\phi$ is spatially caused between the refractive-index grating and the optical interference fringes, and therefore asymmetric energy transfer is observed between two light waves. Thus, optical amplification (optical gain) is obtained.

Such a photorefractive effect is expected to be applied to phase conjugation, imaging from a distorted medium, real-time holography, superimposed holographic recording, 3D display, a 3D printer, optical amplification, nonlinear optical information processing including an optical neutral network, pattern recognition, optical limiting, high-density optical data storage, and the like.

Conventionally, an inorganic crystalline material such as lithium niobate (LiNbO3) has been employed as a photorefractive material. However, the inorganic crystalline material has a problem of low processability. In recent years, organic photorefractive material has been developed.

The organic photorefractive material has many advantages as compared with the inorganic photorefractive material. The advantages encompass the easiness in optimization of a composition ratio and easy processability. Other advantages are large optical nonlinearity, low dielectric constant, low cost, light weight, pliability, and the like. Moreover, other important characteristics desired are that, depending on the purpose of use, the organic photorefractive material possesses long shelf life of data storage, and its optical quality and good thermal stability. Such organic photorefractive materials are becoming important for an advanced information communication technology. Among those, a carbazole type (see, for example, Patent Literature 1) and a triphenylamine type are known.

As a device for sequentially displaying a hologram by sequentially writing holographic images, various kinds of holographic display devices are known, and a photorefractive element including the photorefractive material as described above is used for the display devices. For example, Patent Literature 2 discloses a photorefractive element in which a layer containing a photorefractive material and a layer containing an electron-ion mixed conductor are provided between two transparent electrode substrates.

CITATION LIST

Patent Literature

[Patent Literature 1]
Japanese Patent Application Publication Tokukai No. 2003-322886
[Patent Literature 2]
Japanese Patent Application Publication Tokukai No. 2011-158721

SUMMARY OF INVENTION

Technical Problem

The photorefractive material in the photorefractive element in Patent Literature 2 is made of (i) an inorganic crystalline material such as lithium niobate and (ii) a polymer material, and the electron-ion mixed conductor of the photorefractive element is made of silver sulfide. However, in the case where such a photorefractive element is employed, responsiveness in writing and displaying a hologram is low, and it is difficult to clearly display a hologram of an object which is continuously changing. Therefore, it is difficult to obtain a display performance sufficient for a high-performance holographic display device.

The present invention is intended to solve the conventional problems, and to provide a fast-response photorefractive polymer element that achieves significantly improved responsiveness.

Solution to Problem

In order to solve the above problems, the inventors of the present invention have diligently studied. The inventors have focused on the selection of a compound in a photorefractive polymer element, in which they must achieve high responsiveness and effectively suppress a dark current due to the selection of the compound for improving responsiveness. As a result, the inventors have accomplished the present invention based on the finding that the above issues can be resolved by selecting a triphenylamine polymer as a photorefractive polymer and by providing a self-assembled monolayer in the photorefractive polymer element.

A fast-response photorefractive polymer element of the present invention includes: an insulating substrate; a transparent electrode deposited on one side of the insulating substrate; a dark current control layer fabricated on a surface of the transparent electrode; and a photorefractive composite material sandwiched between the insulating substrate with the transparent electrode and that with the dark current control layer.

Moreover, the fast-response photorefractive polymer element of the present invention further includes: another insulating substrate that is arranged substantially in parallel with the insulating substrate; another transparent electrode provided on an inner surface of the another insulating substrate; and another dark current control layer provided on an inner surface of the another transparent electrode, the photorefractive composite material sandwiched between the insulating substrate and the another insulating substrate with the transparent electrode and the another transparent electrode and with the dark current control layer and the another dark current control layer.

The present invention includes (i) the dark current control layer fabricated on the surface of the transparent electrode and (ii) the photorefractive composite material fabricated on the insulating substrate with the transparent electrode and the dark current control layer. With this configuration, it is possible to suppress the introduction of dark current through the dark current control layer, and thus high responsiveness can be obtained in the photorefractive composite material. This makes it possible to obtain the photorefractive polymer element with significantly improved responsiveness.

The dark current control layer is not limited to a particular one but is preferably a single-layered monomolecular film which is fabricated on the surface of the transparent electrode or multi-layered monomolecular films which are fabricated on the surface of the transparent electrode. By providing the single-layered monomolecular film or the multi-layered monomolecular films between the transparent electrode and the photorefractive composite material, it is possible to cause a Fermi potential of the transparent electrode to be shallower, and thus this efficiently suppresses a dark current which will be caused, for example, by the selection of the photorefractive polymer.

The single-layered monomolecular film or each of the multi-layered monomolecular films is not limited to a particular one but is preferably formed by chemical modification of the surface of the transparent electrode with a silane compound. The silane compound is not limited to a particular one but is preferably 3-aminopropyltrimethoxysilane. By selecting 3-aminopropyltrimethoxysilane as the silane compound, it is possible to suppress the introduction of a dark current to a minimum value.

The single-layered monomolecular film or the multi-layered monomolecular films can be formed by any of various methods. In a case where the monomolecular film is fabricated by the chemical modification using 3-aminopropyltrimethoxysilane, it is preferable to form the single-layered monomolecular film or the multi-layered monomolecular films by the following method: The method includes that (i) the transparent electrode substrate, in which the transparent electrode fabricated on the insulating substrate is soaking in a mixed solution of ammonia water and hydrogen peroxide or in a piranha solution, becomes to be hydrophilic, (ii) self-assembled precursor is fabricated by soaking a hydrophilic electrode substrate, which has been obtained above, in a mixed solvent containing 3-aminopropyltrimethoxysilane, and (iii) removing the excess molecules by washing a surface of the self-assembled precursor with alcohol.

By fabricating the single-layered monomolecular film or the multi-layered monomolecular films with the use of the method described above, it is possible to obtain a monomolecular film in which molecules are systematically oriented and to improve an effect of suppressing a dark current.

The single-layered monomolecular film or each of the multi-layered monomolecular films preferably has a film thickness corresponding to one molecule or more of the silane compound in order to suppress a dark current effectively.

The photorefractive composite material preferably contains a photorefractive polymer represented by a formula (1).

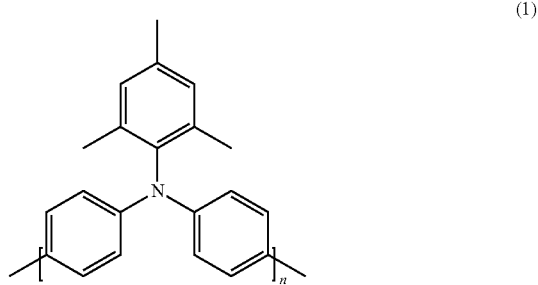

The photorefractive composite material preferably further includes a nonlinear optical dye, a sensitizer, and a plasticizer. A content of the photorefractive polymer is preferably 10% to 50% by weight; a content of the nonlinear optical dye is 20% to 50% by weight; a content of the sensitizer is 0.1% to 3% by weight; and a content of the plasticizer is 10% to 40% by weight.

Significantly high diffraction efficiency and gain coefficient are obtained for the photorefractive composite material consisted of the photorefractive polymer shown by a formula (1), the nonlinear optical dye, the sensitizer, and the plasticizer. This gives the efficient utilization of the charge transport in a stable and uniform film, and thus significantly advanced photorefractive effect can be accomplished, which could not be achieved by conventional materials.

Advantageous Effects of Invention

According to the present invention configured as described above, since the present photorefractive polymer element of the present invention possesses the dark current control layer, provided on the surface of the transparent electrode, and the photorefractive composite material, provided on the insulating substrate with the transparent electrode and the dark current control layer, high responsiveness is achieved by the photorefractive polymer and the introduction of a dark current is suppressed by the dark current control layer. The photorefractive polymer element with significantly improved responsiveness can be fabricated.

DESCRIPTION OF EMBODIMENTS

Figure 1:
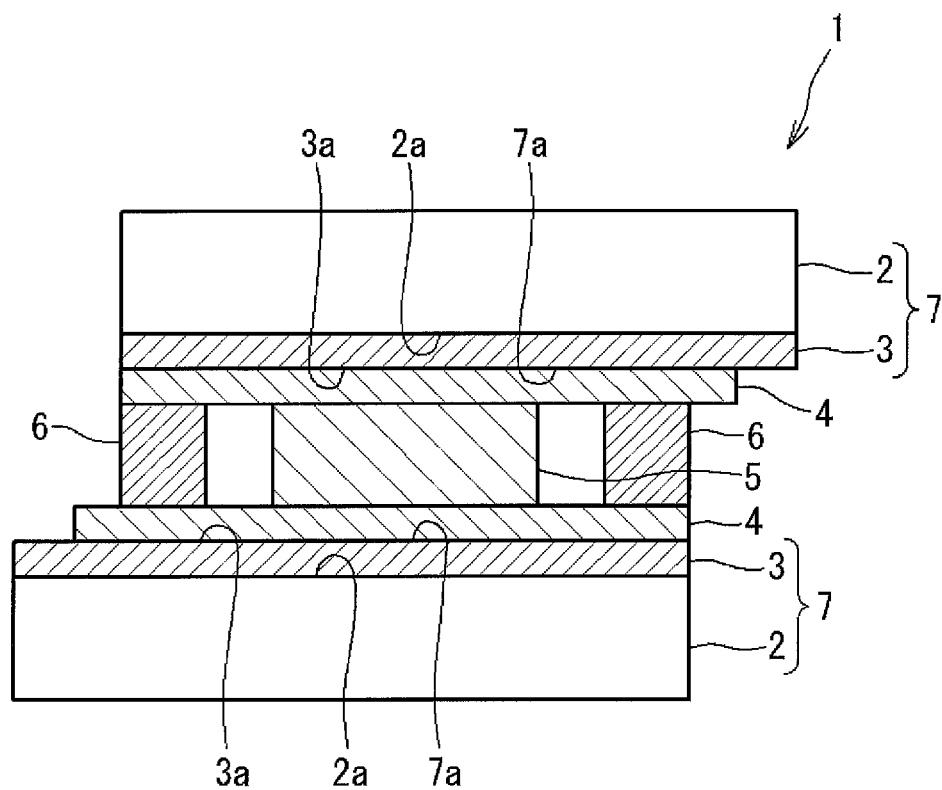
FIG. 1 is a schematic cross-sectional diagram illustrating a fast-response photorefractive polymer element for an embodiment of the present invention.

The following description explains an embodiment of the present invention. FIG. 1 is a schematic cross-sectional diagram illustrating a fast-response photorefractive polymer element 1 (hereinafter, referred to as "photorefractive polymer element") for an embodiment of the present invention. As shown in FIG. 1, the photorefractive polymer element 1 of the present embodiment includes two insulating substrates (2), transparent electrodes (3), dark current control layers (4), a photorefractive composite material (5), and spacers (6). The two insulating substrates (2) are arranged substantially in parallel with each other. The transparent electrodes (3) are provided on respective inner surfaces (2a) of the two insulating substrates (2). The dark current control layers (4) are provided on respective inner surfaces (3a) of the transparent electrodes (3). The photorefractive composite material (5) is provided between the two insulating substrates (2) via the respective transparent electrodes (3) and via the respective dark current control layers (4). The spacers (6) are provided around the photorefractive composite material (5). Here each of the layers in the schematic diagram of FIG. 1 is illustrated to be thicker than actual dimensions in order to make explanation easier.

Two transparent electrode substrates (7), which are arranged in parallel with each other, are constituted by the respective insulating substrates (2) and the respective transparent electrodes (3) which are provided on the respective inner surfaces (2a) of the insulating substrates (2). The insulating substrate (2) is not limited to a particular one and concrete examples of the insulating substrate (2) encompass soda-lime glass, silica glass, borosilicate glass, gallium nitride, gallium arsenide, sapphire, quartz glass, polyethylene terephthalate, and polycarbonate, and a composite substrate obtained by appropriately combining them.

The transparent electrode (3) provided on the inner surface (2a) of each of the insulating substrates (2) is a conductive film and can be selected from a metal oxide film, a metal film, an organic film, and the like. According to the present embodiment, indium tin oxide (ITO) is employed for the transparent electrode (3). However, the transparent electrode (3) is not limited to this. Other concrete examples of the transparent electrode (3) encompass tin oxide, zinc oxide, polythiophene, gold, silver, platinum, copper, aluminum, polyaniline, lithium, magnesium, magnesium-silver mixture, magnesium-indium mixture, aluminum-lithium alloy, carbon such as carbon nanofiber, and a combination of them.

The photorefractive composite material (5) of the present embodiment consists of a photorefractive polymer, as a main component, added by a sensitizer, a nonlinear optical dye, and a plasticizer. With such compositions, significantly high diffraction efficiency and high gain coefficient are obtained. This gives the efficient utilization of the charge transport in the stable and uniform film, and thus significantly advanced photorefractive effect can be accomplished, which could not be achieved by conventional materials.

(Sensitizer)

The sensitizer has a function as an electron acceptor and is added for improving photo-refractivity. When the sensitizer has been added, a charge-transfer complex is formed between the sensitizer and the photorefractive polymer, and useful photo-refractivity is given.

In the present embodiment, [6,6]-phenyl$C_{61}$butyric acid methylester (PCBM) shown by a formula (2) is used as a sensitizer.

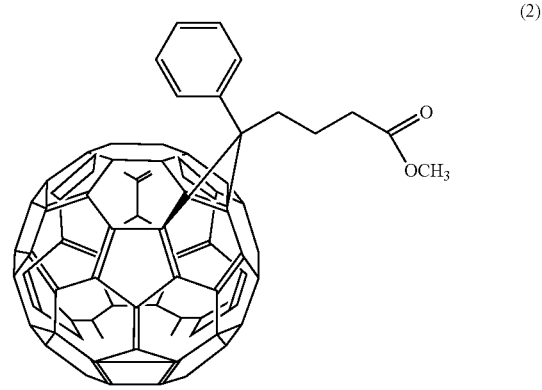

(2)

Other concrete examples of a sensitizer encompass (2,4,7-trinitro-9-Fururenyiriden)malonitrile (TNF-DM), 2,4,7-trinitro-9-fluorenone (TNF), fullerene $C_{60}$, fullerene $C_{70}$, tetracyanobenzene (TCBN), tetracyanoquinodimethane (TCNQ), benzoquinone (BQ), and their derivatives, 2,6-dimethyl-p-benzoquinone (MQ), 2,5-dichloro-p-benzoquinone ($Cl_2Q$), 2,3,5,6-tetrachloro-p-benzoquinone (chloranil), 2,3-dichloro-5,6-p-benzoquinone (DDQ) etc. Among these concrete examples, 2,4,7-trinitro-9-fluorenone (TNF) is preferable in addition to the PCBM, in view of their solubility against the photorefractive polymer, a host matrix. The sensitizer can be used alone or in the combination of two or more of them.

A lower limit content of the sensitizer is preferably 0.1% by weight, further preferably 0.3% by weight, relative to 100% by weight of the photorefractive composite material. An upper limit content of the sensitizer is preferably 3% by weight, further preferably 1% by weight, most preferably 0.6% by weight, relative to 100% by weight of the photorefractive composite material. An optimal content of the sensitizer is approximately 0.5% by weight. The content of the sensitizer is 0.1% by weight or less, leads to poor photo-refractivity. In the case that the content of the sensitizer is more than 3% by weight, a concentration of the charge-transfer complex is increased due to the sensitizer, and this causes the increase in light absorption and therefore the transmittance of light is extremely depressed.

(Nonlinear Optical Dye)

The nonlinear optical dye is donor-acceptor molecule that shows the second-order optical nonlinearity, in which the refractive-index modulates depending on an electrical field through Pockels effect. In the present embodiment, [[4-(hexahydro-1H-azepine-1-yl)phenyl]methylene]propanedinitrile (7-DCST) shown by a formula (3) is used as a nonlinear optical dye.

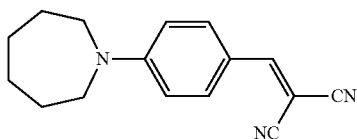

(3)

Examples of other preferable nonlinear optical dye encompass 4-piperidinobenzylidene-malononitrile (PD-CST) shown by a formula (4) and 2-(4-(azepan-1-yl)-2-fluoro-benzylidene)-malononitrile (FDCST) shown by a formula (5).

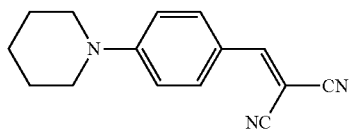

(4)

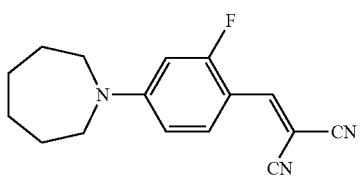

(5)

Other concrete examples of the nonlinear optical dye encompass amino cyano styrene such as 2,5-dimethyl-4-(p-nitrophenylazo)anisole (DMNPAA), 4-amino-4'-nitroazobenzene (ANAB), s-(–)-1-(4-nitrophenyl)-2-pyrrolidinemethanol (NPP), 4-(diethylamino)-(E)-β-nitrostyrene (DEANST), (diethylamino)benzaldehydediphenylhydrazone (DEH), AODCST, TDDCST, and DCDHF-6. The nonlinear optical dye can be used alone or in the combination of two or more of them.

A lower limit content of the nonlinear optical dye is preferably 20% by weight, further preferably 25% by weight, relative to 100% by weight of the photorefractive composite material. An upper limit content of the nonlinear optical dye is preferably 50% by weight, further preferably 40% by weight, most preferably 30% by weight, relative to 100% by weight of the photorefractive composite material. In the case that the content of the nonlinear optical dye is less than 20% by weight, diffraction efficiency and a gain coefficient which are necessary for a photorefractive effect may not be obtained. In the case that the content of the nonlinear optical dye is more than 50% by weight, a quantity ratio relative to the other components becomes unbalanced and such unbalance may cause the poor influence for designing a photorefractive composite.

(Plasticizer)

The plasticizer plays a role for lowering a glass transition temperature of the matrix. In the present embodiment, ethylcarbazole (ECz) shown by a formula (6) is used as a sensitizer.

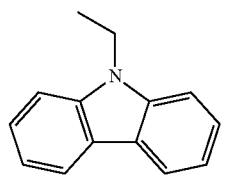

(6)

Other preferable plasticizer can be (2,4,6-trimethylphenyl)diphenylamine (TAA) shown by a formula (7).

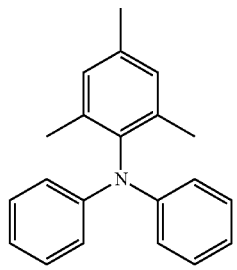

(7)

Other concrete examples of the plasticizer encompass propionic acid carbazoylethyl (CzEPA), triphenylamine (TPA), benzyl butyl phthalate (BBP), dicyclohexyl phthalate (DCP), tricresyl phosphate (TCP), diphenyl phthalate (DPP), N-alkyl-1-pyrolidones such as N-methyl-1-pyrolidone, N-octyl-1-pyrolidone, and N-dodecyl-1-pyrolidone, and imide compounds such as 2-(1,2-cyclohexanedicarboximide)ethyl propionate (AX22), 2-(1,2-cyclohexanedicarboximide)ethyl butyrate, 2-(1,2-cyclohexanedicarboximide) ethyl benzoate, 2-(1,2-cyclohexanedicarboximide)ethyl acrylate, and 2-(phthalimide)ethyl propionate (AX23).

A lower limit content of the plasticizer is preferably 10% by weight, further preferably 15% by weight, relative to 100% by weight of the photorefractive composite material. An upper limit content of the plasticizer is preferably 40% by weight, further preferably 30% by weight, most preferably 20% by weight, relative to 100% by weight of the photorefractive composite material. In the case that the content of the plasticizer is less than 10% by weight, a glass transition temperature of the photorefractive polymer will not be decreased, and diffraction efficiency and gain coefficient necessary for photorefractive effect may not be obtained. In the case that the content of the plasticizer is more than 40% by weight, a quantity ratio relative to the other components becomes unbalanced and such unbalance may cause the poor influence for designing a photorefractive composite.

(Photorefractive Polymer)

The photorefractive polymer is not limited to a particular one and is preferably polytriarylamine of a triarylamine amorphous polymer (PTAA) used in the present embodiment, i.e., poly[bis(4-phenyl)(2,4,6-trimethylphenyl)amine] shown by the formula (1). This is also called polytriarylamine semiconductor.

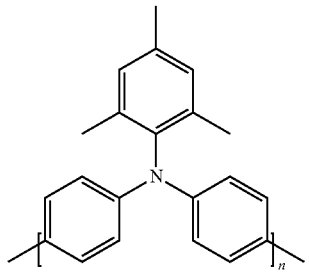

(1)

Poly[bis(4-phenyl)(2,4,6-trimethylphenyl)amine] is an amorphous p-type semiconductor that has high carrier mobility. The mobility is $10^{-2}$ cm$^2$/Vs to $10^{-3}$ cm$^2$/Vs, and in the case that poly[bis(4-phenyl)(2,4,6-trimethylphenyl)amine] is used in the photorefractive polymer element 1, significantly high responsiveness is achieved. As another photorefractive polymer, a photorefractive polymer having a tetraphenyldiaminobiphenyl part also gives high responsiveness.

A lower limit content of the photorefractive polymer represented by a formula (1) is preferably 10% by weight, further preferably 20% by weight, most preferably 30% by weight, relative to 100% by weight of the photorefractive composite material. An upper limit content of the photorefractive polymer shown by a formula (1) is preferably 50% by weight, further preferably 40% by weight, relative to 100% by weight of the photorefractive composite material. In the case that the content is less than 10% by weight, the glass transition point may not be lowered sufficiently. In the case that the content is more than 50% by weight, a quantity ratio relative to the other components (i.e., the nonlinear optical dye, the sensitizer, and the plasticizer) becomes unbalanced and such unbalance may cause the poor influence for designing a photorefractive composite material.

A thickness of the photorefractive composite material (5) is preferably 50 μm to 100 μm. This is because, in the case that the thickness is smaller than 50 μm, a Bragg diffraction condition is difficult to satisfy, and in the case that the thickness is larger than 100 μm, the increase in applied voltage and/or in absorption may be caused.

The spacer (6) is not limited to a particular one, provided to maintain the thickness of the photorefractive composite material. In view of chemical resistance, heat resistance, and the like, polyimide and fluorocarbon polymer such as PTFE or PFA are preferable.

(Dark Current Control Layer)

The dark current control layers (4) of the present embodiment are provided on the respective inner surfaces (7a) of the transparent electrode substrates (7) (ITO electrode substrate) so as to cover the respective inner surfaces (7a). From this, the dark current control layers (4) exist between the photorefractive composite material (5) and the respective transparent electrode substrates (7) so that the transparent electrodes (3) do not contact with the photorefractive composite material (5). The dark current control layers (4) are preferably provided on both the transparent electrode substrates (7). However, one dark current control layer (4) can be provided only on any of the transparent electrode substrates depending on a performance required.

Figure 2:
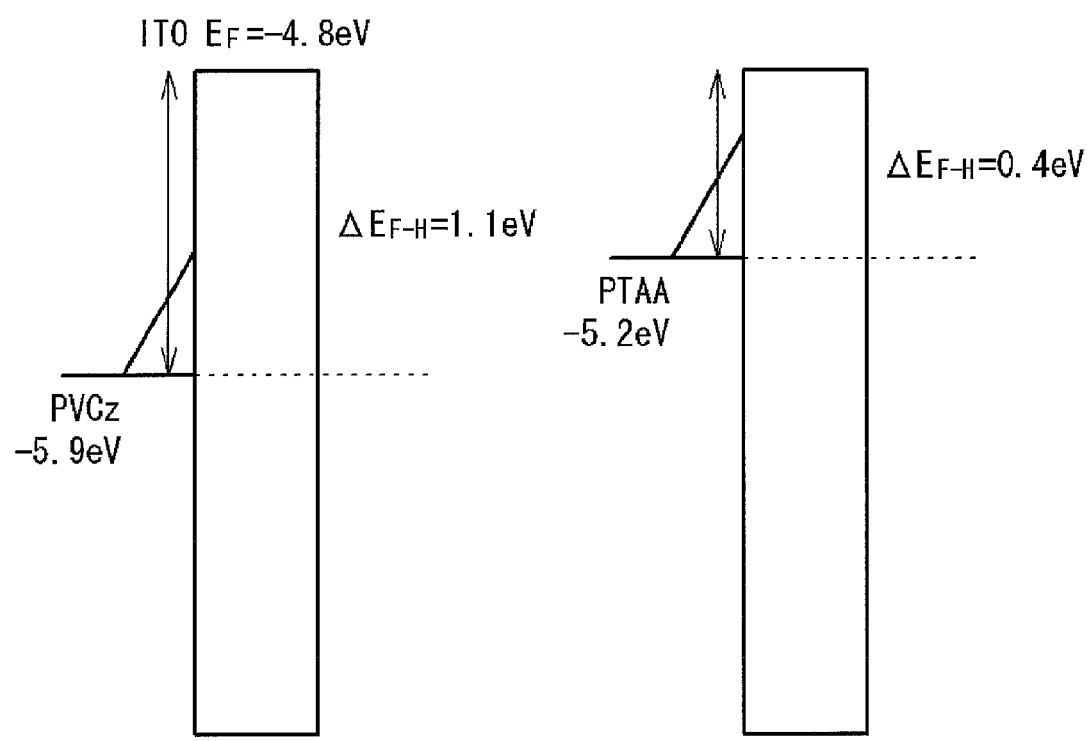
FIG. 2 is a schematic diagram of potentials (right) for explaining an issue arising when PTAA is selected as a photorefractive composite material.
Figure 3:
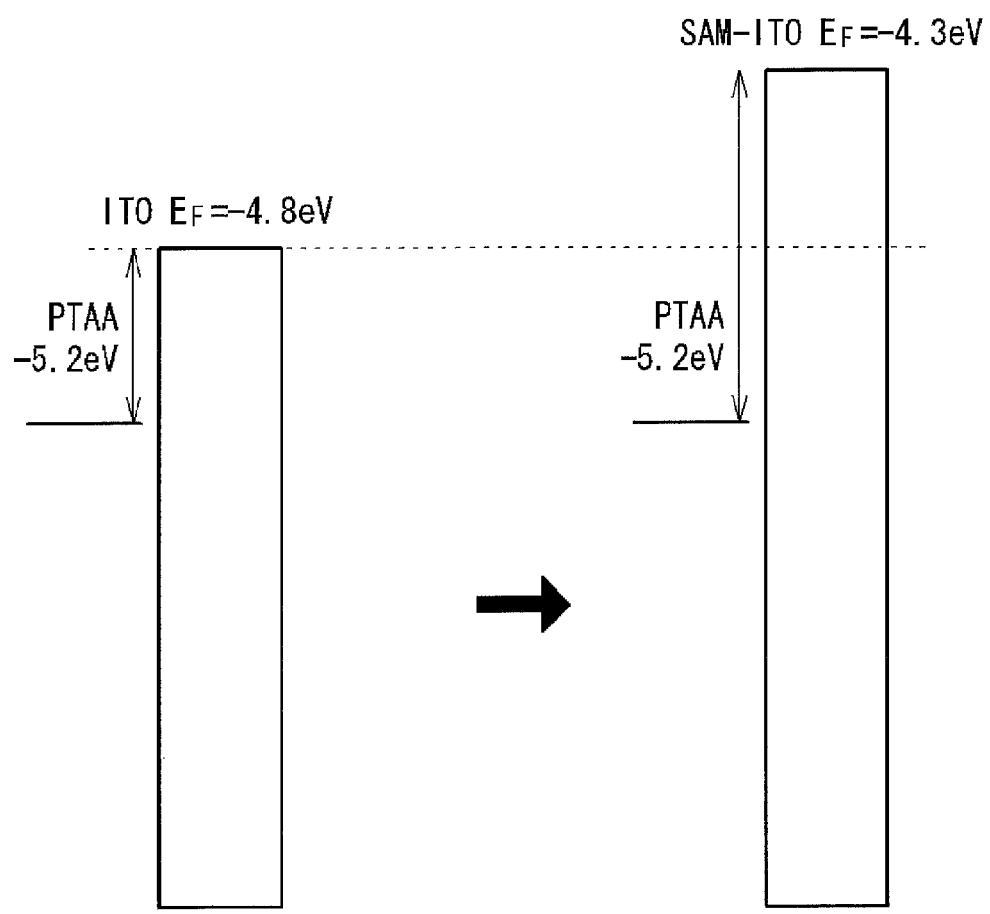
FIG. 3 is a schematic diagram of potentials (right) for explaining a method for solving the above issue by introducing a SAM when PTAA is selected as a photorefractive composite material.

The following description explains a reason why the dark current control layers (4) are provided between the photorefractive composite material (5) and the transparent electrodes (i.e., ITO electrodes) (3). FIG. 2 is a schematic diagram of potentials (right) for explaining an issue that occurs in the case that PTAA is selected as the photorefractive composite material (5). FIG. 3 is a schematic diagram of potentials (right) for explaining a method for solving the above issue by introducing a SAM when PTAA is selected as the photorefractive composite material (5).

From the nature of an interface between the photorefractive composite material (5) and ITO which covers the surface (7a) of each of the transparent electrode substrates (7), Schottky barrier or an electric double layer of interface should be considered. In the case that polytriarylamine (PTAA) that achieves high responsiveness is selected, the highest occupied molecular orbital (HOMO) of PTAA which serves also as a charge generating agent is close to the Fermi level of ITO. In the case that the highest occupied molecular orbital (HOMO) of PTAA approximates to the Fermi level of ITO, the electric charges flow from an ITO electrode by thermal excitation causes a large dark current, and consequently the photoconductivity is reduced and the dielectric breakdown is also caused at a high electric field.

For the comparison, the following description explains a dark current flow for polyvinyl carbazole (PVCz) shown by a formula (8) used as a photorefractive polymer.

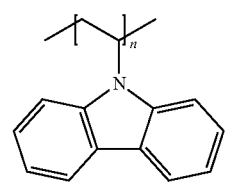

(8)

In the case that PVCz and ITO are combined as shown in FIG. 2, since HOMO of PVCz is −5.9 eV and a Fermi level of ITO is −4.8 eV, an energy level difference ($\Delta E_{F-H}$) is 1.1 eV (see a left part of FIG. 2).

In the case that the PVCz photorefractive polymer is used, a dark current is suppressed and the mobility of the PVCz photorefractive polymer is low, i.e., $10^{-6}$ cm$^2$/Vs to $10^{-7}$ cm$^2$/Vs, and thus it is difficult to achieve fast response of a video rate (30 s$^{-1}$).

On the other hand, in the case of the combination of ITO of PTAA in the present embodiment which can achieve the fast response significantly higher than the video rate, HOMO of PTAA is −5.2 eV and a Fermi level of ITO is −4.8 eV, and an energy level difference ($\Delta E_{F-H}$) is small, i.e., 0.4 eV (see a right part of FIG. 2). Therefore, in the case that PTAA is selected, a large dark current is easily induced.

In the present invention, the issue above is solved by providing the dark current control layer (4) on the surface (3a) of the ITO electrode (3). By providing the dark current control layer (4), as shown in the left and the right figures of FIG. 3, a Fermi level of the ITO electrode (3) becomes shallower (higher) as illustrated in FIG. 3. When the Fermi level of the ITO electrode (3) becomes shallower (higher), the energy level difference between the HOMO of PTAA and the Fermi level becomes larger (in FIG. 3, increased from 0.4 eV to 0.9 eV), and it is therefore possible to suppress the introduction of a dark current.

In the regard to this point, from a result of ultraviolet photoelectron spectroscopy carried out on an organic thin film formed on a metal clean surface, the shift of vacuum level, which is caused by the formation of Schottky barrier or an electric double layer in an interface of the metal and the organic thin film, is used. A shift amount becomes 1 eV depending on a combination of an organic material and metal. Polarities of the electric double layer of the interface are often positive in an organic material and negative in metal.

As a cause of the shift, the charge transfer and an image effect in an interface, the presence of the interface level, an orientation of the permanent dipoles, and the like, have been proposed. However, those seem to be intricately mixed in an actual interface, and it is not easy to predict a shift amount. Moreover, according to this principle, in a system in which chain alkane molecules adhere to a surface of metal, a distance between the molecules and an electrode is an important factor. That is, molecules in a first layer are chemically-modified with metal and therefore an electronic state is changed, and this allows the shift of Fermi level.

The dark current control layer (4) can be selected with various forms. A single-layered monomolecular film or multi-layered monomolecular films formed on the surface (3a) of the ITO electrode (3) are suitable as the dark current control layer (4). The single-layered monomolecular film or the multi-layered monomolecular films are not necessarily formed uniformly over the entire surface (3a) of the ITO electrode (3). That is, an improvement of performance is brought about even if the surface (3a) of the ITO electrode (3) partially has an area in which none of the single-layered monomolecular film and the multi-layered monomolecular films is provided. Alternatively, it is possible to provide a monomolecular film in a part of the surface (3a) and to provide multi-layered monomolecular films in the other part of the surface (3a). Alternatively, the surface (3a) on the ITO electrode (3), can have plural areas in each of which a single-layered monomolecular film is provided and also another plural areas in each of which multi-layered monomolecular films are provided.

As the dark current control layer (4) of the present embodiment, a self-assembled monolayer (SAM), self-organized on the ITO electrode (3), is employed. The single-layered monomolecular film or the multi-layered monomolecular films are not limited to the self-assembled monolayer. The self-assembled monolayer is formed by chemically modifying the inner surface (3a) with a silane compound. The silane compound is not limited to a particular one and 3-aminopropyltrimethoxysilane (APTMS) is most preferable. Examples of other self-assembled monolayer encompass a trichlorosilane-type film and a dimethylchlorosilane-type film.

The self-assembled monolayer is a monomolecular film formed by self-assembling or self-organization, and is a molecular association formed on a solid surface in the process of chemical adsorption of organic molecules. By interaction among the adsorbed molecules, the associated molecules closely assemble. Consequently, the structures having highly regular molecular orientations and molecular sequences are spontaneously formed.

The self-assembled monolayer can be formed on the transparent electrode (3) by any of various methods such as a method utilizing an acid-base reaction, a method utilizing a silane coupling reaction, and a method utilizing a hydrogen-terminated silicon surface. It is preferable to form the self-assembled monolayer by the following method.

Figure 4:
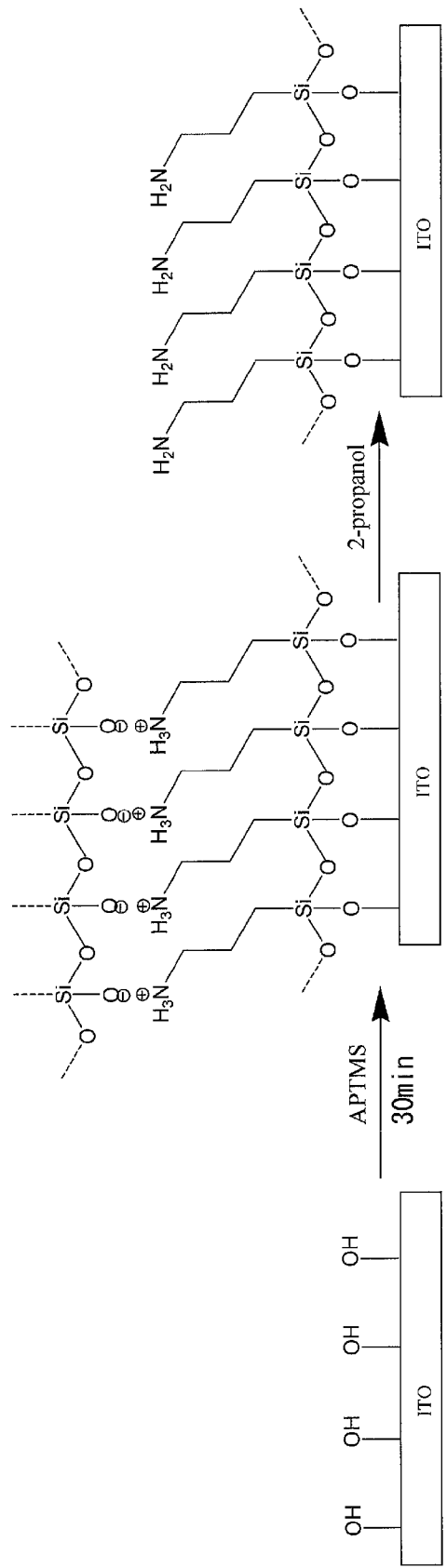
FIG. 4 is a schematic diagram illustrating the formation of a self-assembled monolayer on an ITO electrode substrate.

FIG. 4 is a schematic diagram illustrating the formation of a self-assembled monolayer (SAM) on the ITO electrode substrate (7) as the dark current control layer (4). As pretreatment, the ITO electrode substrate is soaked in a mixed solution of ammonia water and hydrogen peroxide or in a piranha solution for 15 minutes so that a surface of the ITO electrode substrate becomes to be hydrophilic. Then, the hydrophilic ITO electrode substrate is soaked in a methanol solution containing 1% of 3-aminopropyltrimethoxysilane (APTMS) for 30 minutes, and an assembled precursor, shown in a middle part in FIG. 4, is formed. Further, a surface of the assembled precursor film is washed by 2-propanol to remove excess molecules, and consequently a SAM is formed. These procedures give a SAM-covered ITO electrode substrate. In forming the SAM, conditions for film formation such as a mixing ratio of components in a solution for hydrophilization, a kind of solvent, soaking time, and a component for washing can be appropriately changed depending on a type of transparent electrodes. Forming the self-assembled monolayer with the method described above induces a monomolecular film in which molecules are systematically oriented, and thus an effect of suppressing a dark current is improved.

Assembled precursor molecules for SAM have a head group and a terminal group. A head group and a terminal group are linked by a hydrocarbon chain. The assembled precursor molecules are solved in solvent, and a surface on which a SAM will be formed is soaked in the solvent to form SAM. Unlike a simple adhesion phenomenon to a surface, assembled precursor molecules spontaneously form two-dimensional fine structures on an adsorbed surface. This is why this thin layer is called self-organization monomolecular layer. Instead of soaking method, alternative method by evaporation in high vacuum or by spraying can be employed. A head group can be classified into three types, i.e., a thiol system (mainly HS-group), a silane system (mainly X3Si-group), and an acetic acid system (mainly COOH-group). Each adsorbs different substances.

A characteristic of the surface after a SAM is formed varies depending on a terminal group. As a terminal group, ferrocene, quinone, porphyrin, and the like, in addition to a methyl group ($CH_3$ group), an amino group ($NH_2$ group), and a carboxyl group (COOH group) are variously synthesized in accordance with the purpose of use. A layer thickness of the self-assembled monolayer is preferably a thickness corresponding to 1 molecule of a silane compound in order to effectively suppress a dark current.

The following description explains a method for fabricating the photorefractive polymer element 1. The method described here is merely an example, and alternative other methods and other conditions can be employed to fabricate the photorefractive polymer element 1. The photorefractive polymer element 1 of the present embodiment is fabricated by a method including steps of (i) dissolving a photorefractive polymer in a solvent, (ii) removing the solvent, and (iii) preparing a sandwich type element.

In dissolving step, a photorefractive polymer, a nonlinear optical dye, a plasticizer, and a sensitizer are dissolved with a given ratio in solvent. The solvent is not limited to a particular one, and tetrahydrofuran (THF), chloroform, N-methylpyrrolidone (NMP), dimethylformamide, and the like, is used, preferably THF is used. A dissolving temperature can be around a room temperature. If needed, the solution can be stirred. A method for stirring the solution is not limited to a particular one and, for example, a method employing a stirrer chip and the like.

In the step for removing the solvent, the solvent is evaporated. A method for removing the solvent is not limited to a particular one and, for example, a method in which a film can be cast is employed. Concretely, after an ITO electrode is deposited on an insulating substrate to form an ITO electrode substrate, a SAM (i.e., a dark current control layer) is formed on a surface of the ITO electrode substrate, and thus a SAM-covered ITO electrode substrate is obtained. Subsequently, a solution dissolved components is spread out on a surface of the SAM-covered ITO electrode substrate, and then the solvent is evaporated at the room temperature and dried naturally overnight, and drying under a reduced pressure is carried out at approximately 80° C. for 12 hours to evaporate solvent.

In the step for preparing a sandwich type element, after the solvent is removed, spacers (polyimide, thickness of 50 µm) are set at respective four corners, and the sample is covered by another SAM-covered ITO electrode substrate prepared separately, and the SAM-covered ITO electrode substrates are pressed under heating and in vacuum using a vacuum pressing machine. A thickness of the photorefractive composite material in the element is preferably 50 µm to 100 µm. In the case that the thickness is smaller than 50 µm, the Bragg diffraction condition is hardly satisfied. In the case that the thickness is thicker than 100 µm, an applied voltage is increased and/or absorption is increased.

The photorefractive element produced by the method described above can be applied to, for example, recording/reproduction of a moving image such as a video image, real-time hologram, manipulation of a wave front or a phase of light, pattern recognition, optical amplification, nonlinear optical information processing, superimposed holographic recording, high-density optical data storage, an optical correlation system, an optical computer, and the like.

According to the present invention, the dark current control layers (4) are formed on respective inner surfaces (7a) of the two ITO electrode substrates (7), and the photorefractive composite material (5) is provided whose main component is PTAA. With the configuration, high responsiveness is induced by a PTAA, and the introduction of a dark current is suppressed by the dark current control layer (4) and accordingly dielectric breakdown is not caused. This makes it possible to obtain the photorefractive polymer element 1 having significantly improved responsiveness.

By providing a dark current control layer (4) between an ITO electrode (transparent electrode) (3) and the photorefractive composite material (5), the Fermi potential of an ITO electrode (3) becomes shallower and the introduction of a dark current, caused by the selection of PTAA, can be efficiently suppressed. The self-assembled monolayer, the component of the dark current control layer (4), is formed by chemical modification of the surface (3a) of the ITO electrode (3) with 3-aminopropyltrimethoxysilane. The generation of a dark current can be suppressed to a minimum, and therefore the dielectric breakdown can be surely prevented.

EXAMPLES

The details of the present invention are explained in accordance with the Examples. However, the present invention is not limited by the Examples. Photorefractive polymer elements in Examples 1 to 6 were prepared. Each dark current control layer in Examples 1 to 6 is made by a SAM. A thickness of a photorefractive composite was adjusted 80 µm to 115 µm. The followings are the components of the photorefractive composite in each Example.

Example 1

Photorefractive polymer: PTAA/44% by weight
Nonlinear optical dye: 7-DCST/35% by weight
Plasticizer: ECz/20% by weight
Sensitizer: PCBM/1% by weight Example 2

Photorefractive polymer: PTAA/42% by weight
Nonlinear optical dye: PDCST/35% by weight
Plasticizer: TAA/20% by weight
Sensitizer: PCBM/3% by weight Example 3

Photorefractive polymer: PTAA/44% by weight
Nonlinear optical dye: PDCST/35% by weight
Plasticizer: TAA/20% by weight
Sensitizer: PCBM/1% by weight Example 4

Photorefractive polymer: PTAA/44.5% by weight
Nonlinear optical dye: PDCST/35% by weight
Plasticizer: TAA/20% by weight
Sensitizer: PCBM/0.5% by weight Example 5

Photorefractive polymer: PTAA/44.7% by weight
Nonlinear optical dye: PDCST/35% by weight
Plasticizer: TAA/20% by weight
Sensitizer: PCBM/0.3% by weight Example 6

Photorefractive polymer: PTAA/44.9% by weight
Nonlinear optical dye: PDCST/35% by weight
Plasticizer: TAA/20% by weight
Sensitizer: PCBM/0.1% by weight Photorefractive polymer elements in Comparative Examples 1 to 4 were prepared. In Comparative Examples 2 and 3, no dark current control layer is provided. In Comparative Examples 1 and 4, a dark current control layer, a SAM, was provided. A thickness of a photorefractive composite was adjusted 80 µm to 115 µm. The followings are the components of the photorefractive composite in each Example.

Comparative Example 1

Photorefractive polymer: PTAA/45% by weight
Nonlinear optical dye: PDCST/35% by weight
Plasticizer: TAA/20% by weight
Sensitizer: PCBM/0% by weight Comparative Example 2

Photorefractive polymer: PTAA/45% by weight
Nonlinear optical dye: 7-DCST/35% by weight
Plasticizer: ECz/20% by weight
Sensitizer: PCBM/0% by weight Comparative Example 3

Photorefractive polymer: PVCz (Mw: 370000)/44% by weight
Nonlinear optical dye: 7-DCST/35% by weight
Plasticizer: ECz/20% by weight
Sensitizer: TNF/1% by weight Comparative Example 4

Photorefractive polymer: PVCz (Mw: 370000)/44% by weight
Nonlinear optical dye: 7-DCST/35% by weight
Plasticizer: ECz/20% by weight
Sensitizer: TNF/1% by weight (Measurement of Diffraction Efficiency)

Figure 5:
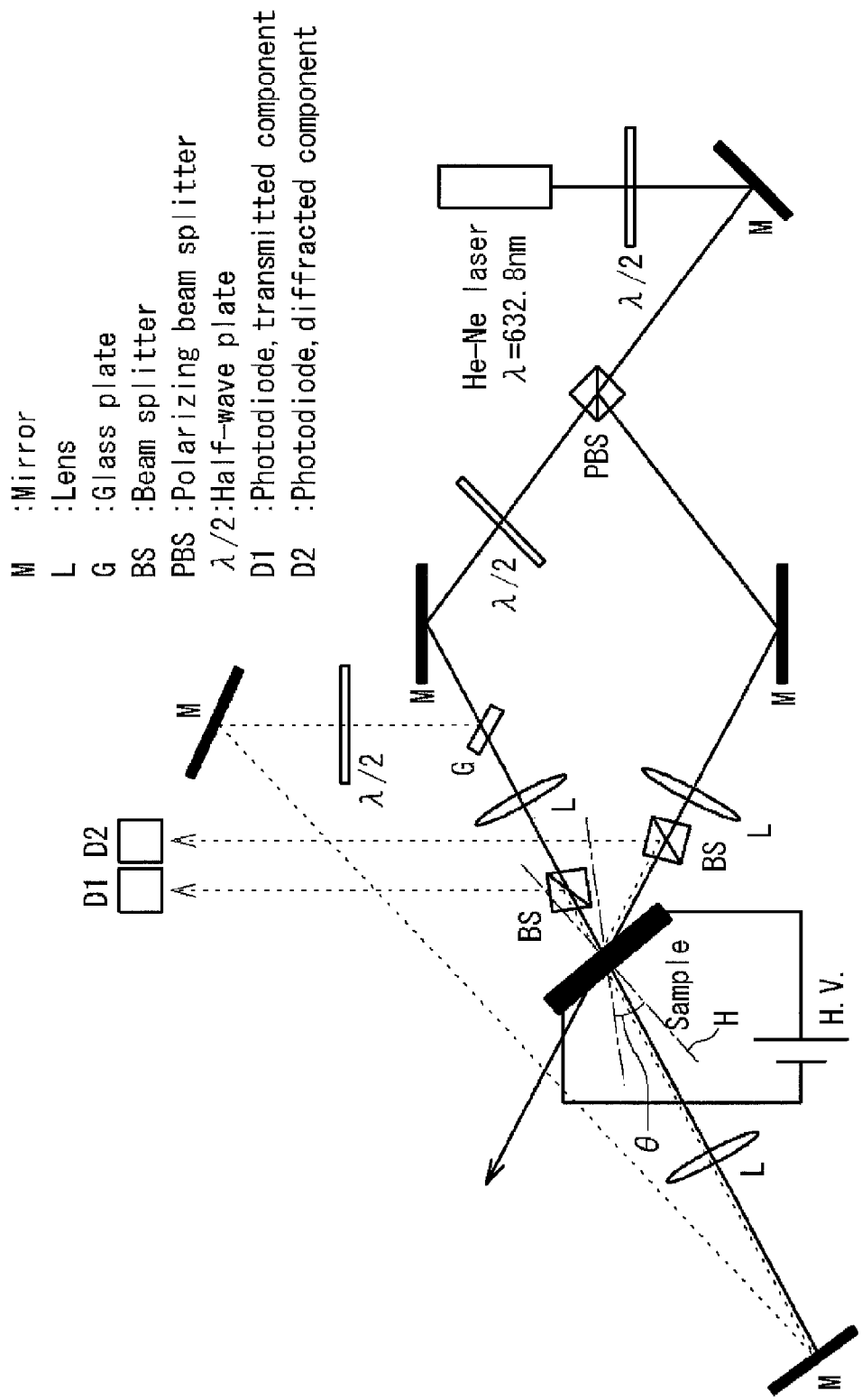
FIG. 5 is a schematic diagram explaining a degenerate four wave mixing for a measurement of diffraction efficiency.

FIG. 5 is a schematic diagram for explaining a degenerate four wave mixing (DFWM) to measure diffraction efficiency (%). The diffraction efficiency (%) was measured by a four wave mixing technique with an electric field applied (45 V/μm) to a photorefractive polymer element. He—Ne laser of 632.8 nm was used for the measurement. The diffraction efficiency (%) caused by a photorefractive effect, i.e., a refractive-index modulation Δn is evaluated by an amplitude measurement of Bragg diffraction (i.e., diffraction efficiency measurement). The diffraction efficiency is measured by probing amplitude of a low power reading light diffracted by a refractive-index grating formed by the writing light under a Bragg condition. Here, normalized diffraction efficiency $\eta_{norm}$ is evaluated by a formula (1). The diffraction efficiency is measured when the photorefractive polymer element (Sample) is tilted with an angle θ of 50° between a normal H of the photorefractive polymer element and a bisector of two interference beams.

$$\eta_{norm} = \frac{I_{diffracted}}{I_{transmitted} + I_{diffracted}} \quad (1)$$

In a formula (1), "$I_{diffracted}$" indicates the intensity of light diffracted by a refractive-index grating, and "$I_{transmitted}$" indicates the intensity of transmitted light. The normalized diffraction efficiency $\eta_{norm}$ is associated with a refractive-index modulation Δn based on Kogelnik's Coupled-Wave Theory in a thick medium. The normalized diffraction efficiency $\eta_{norm}$ is related to the refractive-index modulation Δn in one formula, and thus the refractive-index modulation Δn is evaluated from the normalized diffraction efficiency $\eta_{norm}$. The intensity $I_{diffracted}$ of the diffracted light is measured with the use of a high speed bench meter (e.g., 34411 digital multimeter manufactured by Agilent Technologies) and the intensity $I_{transmitted}$ of transmitted light is measured with the use of a high speed bench meter (e.g., 34411 digital multimeter manufactured by Agilent Technologies).

(Measurement of Response Time)

Response time was calculated by fitting based on Kohlrausch-Williams-Watts (KWW) formula (2), where "η" indicates the diffraction efficiency, "$\eta_0$" indicates the saturated diffraction efficiency, "t" indicates time, "τ" indicates the response time, and "β (0<β≤1)" indicates dispersion.

$$\eta \% = \eta_0 \{1 - \exp[-(t/\tau)^\beta]\} \quad (2)$$

Table 1 summarizes the results of measured diffraction efficiency and response time.

In Examples 1 to 6 in which PTAA was used, the diffraction efficiency was 0.9% to 24.5%, the response speed was 3.2 ms to 86.0 ms, the optical gain (gain coefficient) was 14.0 cm$^{-1}$ to 63.3 cm$^{-1}$. In Comparative Example 1, the response time was slower because of no sensitizer used. In Comparative Example 2, a large dark current was induced because of no SAM provided, and thus no photorefractive measurement could not be carried out. The optical gain (gain coefficient) was calculated by formula (3) or (4).

$$\Gamma = \frac{1}{d/\cos\theta}[\ln(\gamma_0 \beta) - \ln(\beta + 1 - \gamma_0)] \quad (3)$$

$$\Gamma d = \cos\alpha_A \ln\left(\frac{I_A^t(I_B \neq 0)}{I_A^t(I_B = 0)}\right) - \cos\alpha_B \ln\left(\frac{I_B^t(I_A \neq 0)}{I_B^t(I_A = 0)}\right) \quad (4)$$

where "d" is a sample thickness, "$\gamma_0 = I^t_A(I_B \neq 0)/I^t_A(I_B = 0)$", "$\beta = I_B/I_A$", "$I^t_A$", and "$I^t_B$" are each intensity of transmitted writing light.

In comparison between Comparative Example 3 and Comparative Example 4, very slight change in photorefractive performance is induced by providing a SAM, i.e., no significant difference was obtained between the presence and the absence of a SAM. This is because no significant dark current is induced, and thus no effect was brought about by inducing a SAM.

From the above results, the selection of PTAA and the introduction of a SAM shown in Examples 1 to 6, achieves a response time of 3.2 ms to 20.4 ms (corresponding to a video rate of 49 s$^{-1}$ to 312 s$^{-1}$), which is much higher than the video rate (30 s$^{-1}$).

Figure 6:
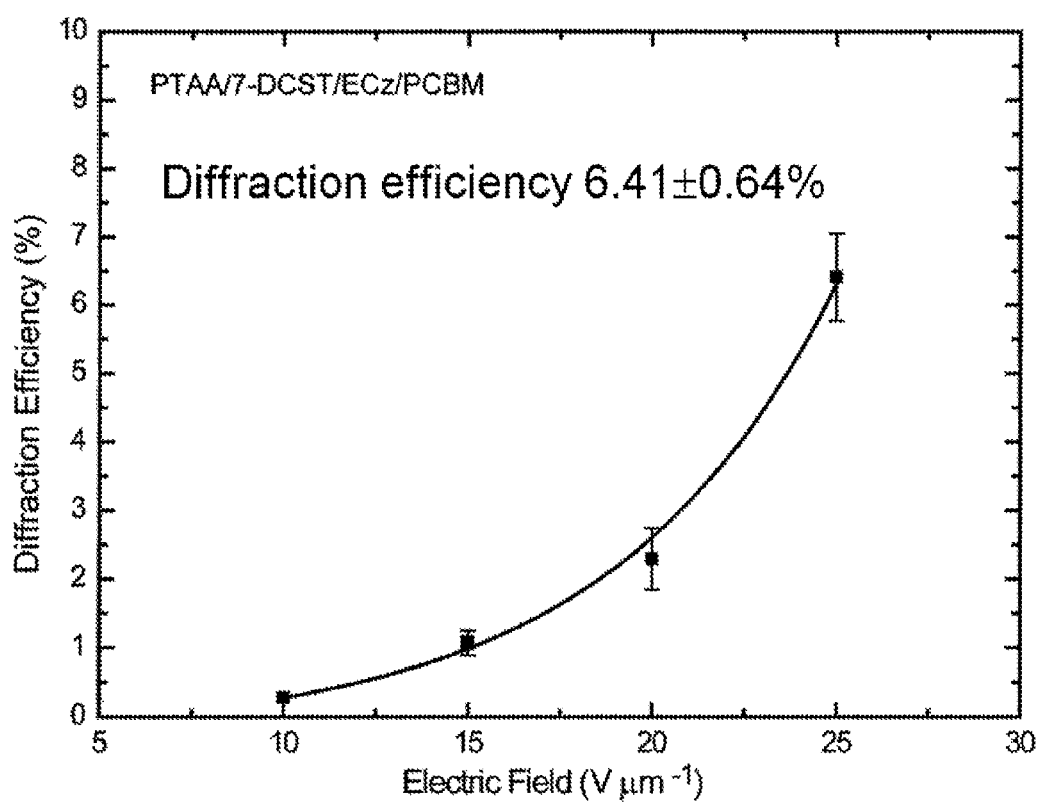
FIG. 6 is plots of diffraction efficiency as a function of electric field strength in Example 1.
Figure 7:
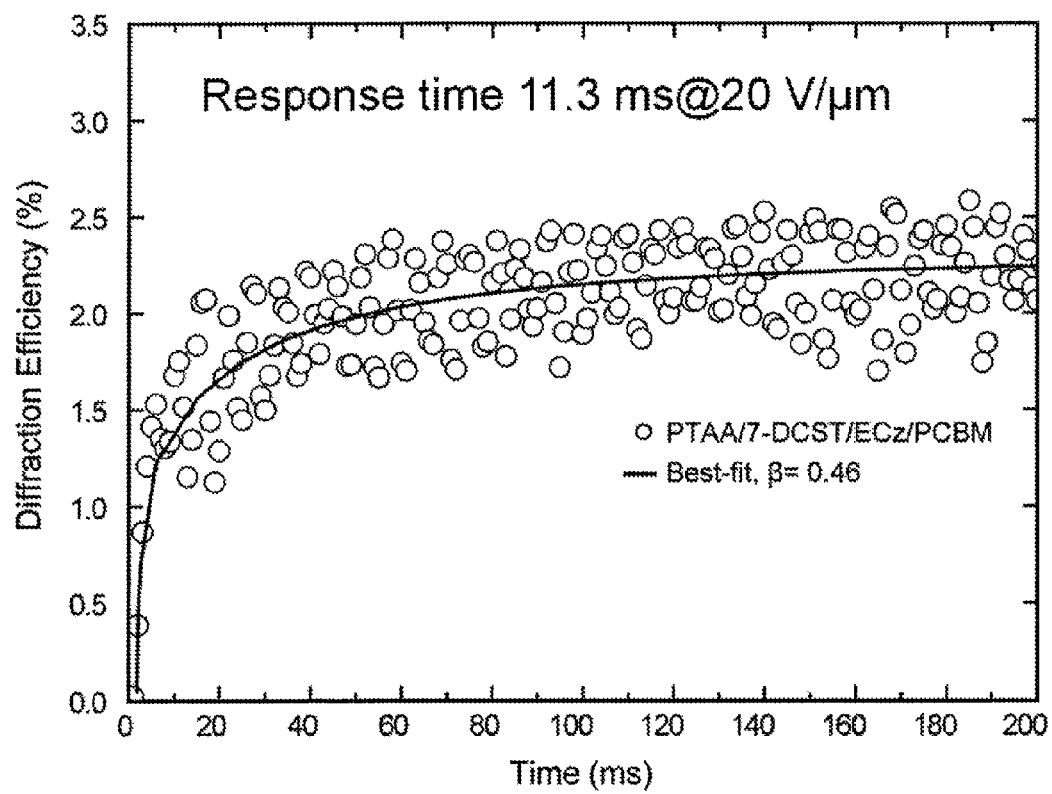
FIG. 7 is a plot of temporal response of diffraction efficiency as a function of writing time in Example 1.
Figure 8:
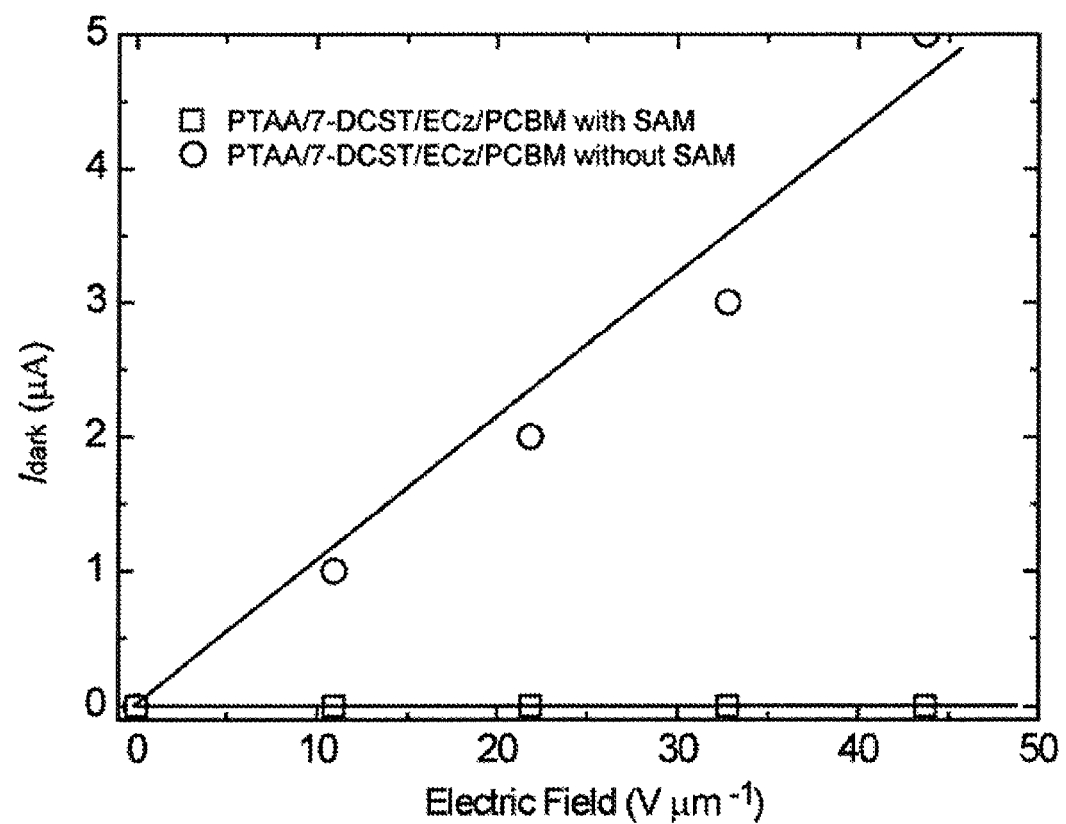
FIG. 8 is plots of the dark current as a function of an applied electric field.

FIG. 6 is plots of diffraction efficiency as a function of electric field strength in Example 1. FIG. 7 is a plot of temporal response of diffraction efficiency as a function of writing time in Example 1. FIG. 8 is plots of the dark current as a function of an applied electric field. From FIG. 6, the diffraction efficiency was 6% at 25 V/μm. FIG. 7 shows temporal response of diffraction efficiency at 20 V/μm. In this case, the response time was 11.3 ms (the value β in FIG. 7 indicates dispersion). The plots in FIG. 8, which represents the relation between an applied electric field and a dark current, shows that a large dark current flows occur in proportion to the application of an electric field for the sample without SAM, whereas no significant dark current flows for the sample with SAM.

Figure 9:
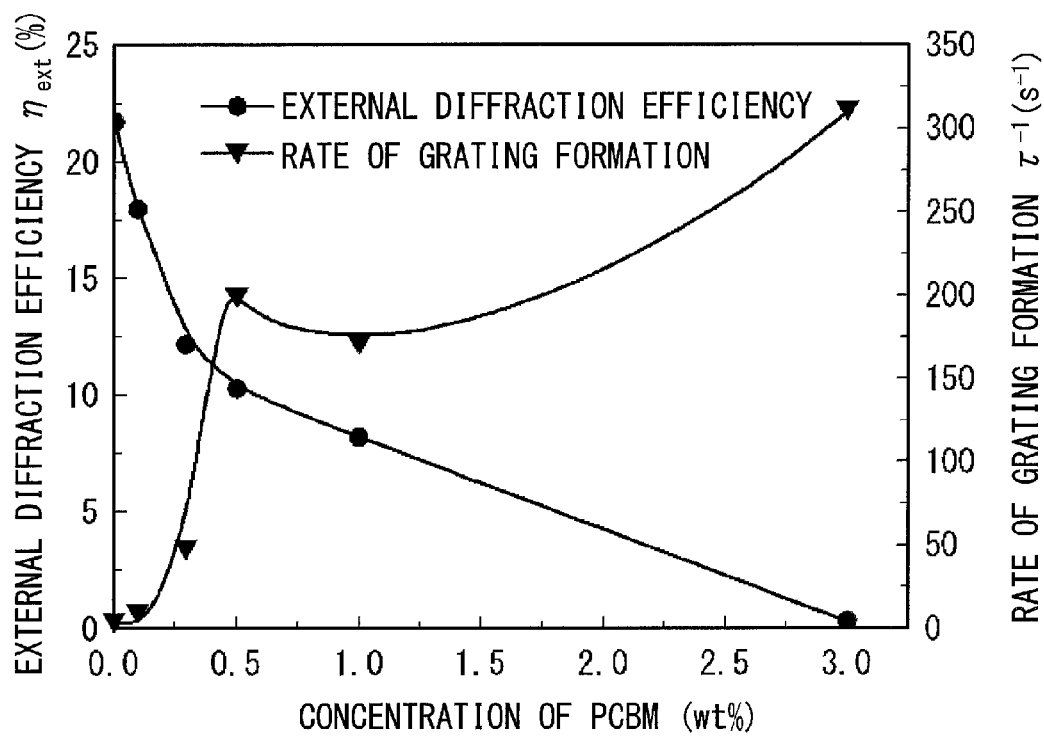
FIG. 9 is plots of external diffraction efficiency and rate of grating formation as a function of a concentration of sensitizer, PCBM.
Figure 10:
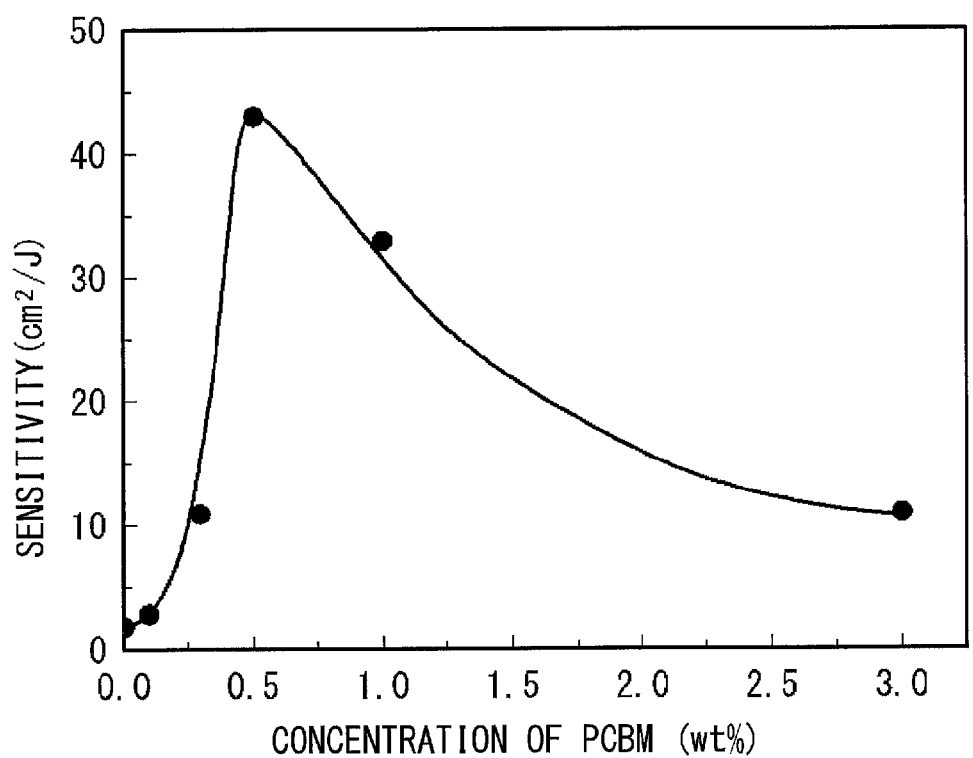
FIG. 10 is plots of sensitivity as a function of a concentration of sensitizer, PCBM.

FIG. 9 is plots of external diffraction efficiency and grating formation speed as a function of a concentration of sensitizer, PCBM. FIG. 10 is plots of sensitivity as a function of a concentration of sensitizer, PCBM. As a figure of merit of photo-refractivity, sensitivity S defined by for-

| | Example 1 | Example 2 | Example 3 | Example 4 | Example 5 | Example 6 | Com. Ex. 1 | Com. Ex. 2 | Com. Ex. 3 | Com. Ex. 4 |
|---|---|---|---|---|---|---|---|---|---|---|
| PRP | PTAA | PTAA | PTAA | PTAA | PTAA | PTAA | PTAA | PTAA | PVCz | PVCz |
| Nonlinear optical dye | 7-DCST | PDCST | PDCST | PDCST | PDCST | PDCST | PDCST | 7-DCST | 7-DCST | 7-DCST |
| Plasticizer | ECz | TAA | TAA | TAA | TAA | TAA | TAA | ECz | ECz | ECz |
| Sensitizer | PCBM | PCBM | PCBM | PCBM | PCBM | PCBM | PCBM | PCBM | TNF | TNF |
| SAM | Provided | Provided | Provided | Provided | Provided | Provided | Provided | None | None | Provided |
| Internal diffraction efficiency % | 6.0 | 0.9 | 13.8 | 16.6 | 18.7 | 24.5 | 29.8 | — | 50 | 39 |
| External diffraction efficiency % | — | 0.3 | 8.2 | 10.3 | 12.2 | 18.0 | 21.7 | — | — | — |
| Optical gain cm$^{-1}$ | — | 14.0 | 63.3 | 53.6 | 51.2 | 47.6 | 39.9 | — | — | — |
| Response time ms | 11 | 3.2 | 5.8 | 5.0 | 20.4 | 86.0 | 170.5 | — | 129 | 101 |

Com. Ex.: Comparative Example mula (5) is used. The sensitivity S is high when the diffraction efficiency is high, laser energy per unit area is low, and the response time is short. That is, larger sensitivity S indicates that a hologram image becomes brighter and a formation speed of hologram image becomes faster.

$$S = \frac{\sqrt{\eta}}{I \times \tau} \quad (5)$$

(where "η" is diffraction efficiency, "I" is laser energy per unit area, and "τ" is response time).

As shown in FIG. 9, there is a correlation between the concentration of PCBM and the external diffraction efficiency and the rate of the grating formation. As the concentration of PCBM becomes higher, the external diffraction efficiency is decreased and the rate of the grating formation is increased. As shown in FIG. 10, the sensitivity is highest when the concentration of PCBM is approximately 0.5% by weight.

The embodiments and Examples disclosed above are merely exemplary and are not limitative. For example, the photorefractive composite material of the photorefractive polymer element can contain other component(s) as long as photo-refractivity is not impaired. Examples of such other component(s) encompass an antioxidant, an ultraviolet absorber, and the like.

In the embodiment described above, two transparent electrode substrates are used as an example. However, a photorefractive polymer element can be prepared by providing a dark current control layer and a photorefractive polymer composite on a single transparent electrode substrate. That is, the present invention is concerned with a fast-response photorefractive polymer element in which an insulating substrate, a transparent electrode provided on one side of the insulating substrate, a dark current control layer provided on a surface of the transparent electrode, and the photorefractive composite material provided on the insulating substrate with the transparent electrode and the dark current control layer are included. That is, the present invention encompasses any aspects of the fast-response photorefractive polymer element as long as the dark current control layer is provided between the transparent electrode and the photorefractive composite material on the transparent electrode substrate.

An ITO electrode has been conventionally used in a photorefractive polymer element because HOMO of a side-chain carbazole system or HOMO of a side-chain triphenylamine system is sufficiently deeper than the Fermi level of ITO. Hereafter, it seems that further fast-response is requested for a photorefractive polymer element, and the demanding for photorefractive polymer elements in which a SAM is provided as in the present invention will be grown. Meanwhile, indium which is a main component of ITO is rare metal whose stable supply is worried and whose price is expected to increase. Under these circumstances, in consideration of industrialization, the selection of a transparent electrode other than an ITO electrode is demanded in view of cost and environment.

Examples of alternative potential material for ITO encompass ZnO: −5.8 eV (Fermi level), Ga$_2$O$_3$/ZnO: −5.1 eV, GaN: −5.5 eV, MgO/C: Unknown, a graphene sheet: −4.4 eV, and PEDOT/PPS: −5.8 eV, some of which are already exemplified above. These materials have Fermi levels deeper than that of ITO, i.e., −4.8 eV, and were not suitable for a photorefractive polymer element in the conventional techniques. However, by applying the present invention, such alternative materials for ITO can be selected, and the present invention will contribute significantly to the information industry and the like.

REFERENCE SIGNS LIST

1: Photorefractive polymer element
2: Insulating substrate
3: Transparent electrode (ITO electrode)
4: Dark current control layer (SAM)
5: Photorefractive composite material
6: Spacer
7: Transparent electrode substrate

The invention claimed is:

1. A fast-response photorefractive polymer element comprising:
   an insulating substrate;
   a transparent electrode provided on one side of the insulating substrate;
   a dark current control layer provided on a surface of the transparent electrode, and a dark current control layer consisting of a single-layered monomolecular film or multi-layered monomolecular films by controlling a Fermi level of the transparent electrode and suppressing a dark current; and
   a photorefractive composite material provided on the insulating substrate with the transparent electrode and the dark current control layer, containing a photorefractive polymer;
   wherein the dark current control layer is a self-assembled monolayer which is assembled on the surface of the transparent electrode by itself, and the self-assembled monolayer is formed by the chemical modification of the surface of the transparent electrode with 3-aminopropyltrimethoxysilane.

2. The fast-response photorefractive polymer element as set forth in claim 1, further comprising:
   another insulating substrate that is arranged substantially in parallel with the insulating substrate;
   another transparent electrode provided on an inner surface of another insulating substrate; and
   another dark current control layer provided on an inner surface of another transparent electrode, another dark current control layer consisting of a single-layered monomolecular film or multi-layered monomolecular films by controlling a Fermi level of the transparent electrode and suppressing a dark current,
   the photorefractive composite material provided between an insulating substrate with a transparent electrode, a dark current control layer and/or another insulating substrate with another transparent electrode, another dark current control layer.

3. The fast-response photorefractive polymer element as set forth in claim 1, wherein:
   the self-assembled monolayer is formed by (i) causing the transparent electrode substrate, in which the transparent electrode is provided on the insulating substrate, to become hydrophilic by soaking the transparent electrode substrate in a mixed solution of ammonia water and hydrogen peroxide or in a piranha solution, (ii) producing an assembled precursor by soaking a hydrophilic electrode substrate, which has been obtained above, in a solvent containing 3-aminopropyltrimethoxysilane, and (iii) removing excess molecules by washing a surface of the assembled precursor with alcohol.

4. The fast-response photorefractive polymer element as set forth in claim 3, wherein:
   the self-assembled monolayer has a film thickness which corresponds to one molecule of the silane compound.

5. The fast-response photorefractive polymer element as set forth in claim 1, wherein:
   the photorefractive composite material contains a photorefractive polymer represented by a formula (1) as a main component

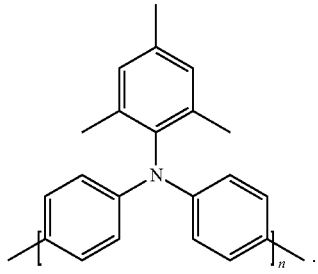

(1)

6. The fast-response photorefractive polymer element as set forth in claim 5, wherein:
   the photorefractive composite material contains a nonlinear optical dye, a sensitizer, and a plasticizer.

7. The fast-response photorefractive polymer element as set forth in claim 6, wherein:
   a content of the photorefractive polymer is 10% by weight to 50% by weight;
   a content of the nonlinear optical dye is 20% by weight to 50% by weight;
   a content of the sensitizer is 0.1% by weight to 3% by weight; and
   a content of the plasticizer is 10% by weight to 40% by weight.

* * * * *